United States Patent [19]

Nakata

[11] Patent Number: 5,760,368

[45] Date of Patent: Jun. 2, 1998

[54] LASER BEAM METHOD USING AN INACTIVE GAS AS THE ASSIST GAS

[75] Inventor: Yoshinori Nakata, Yamanashi, Japan

[73] Assignee: Fanuc, Ltd., Yamanasihi, Japan

[21] Appl. No.: 596,213

[22] PCT Filed: Jun. 8, 1995

[86] PCT No.: PCT/JP95/01156

§ 371 Date: Feb. 15, 1996

§ 102(e) Date: Feb. 15, 1996

[87] PCT Pub. No.: WO96/01719

PCT Pub. Date: Jan. 25, 1996

[30] Foreign Application Priority Data

Jul. 8, 1994 [JP] Japan ................... 6-156958

[51] Int. Cl.[6] ............................... B23K 26/14
[52] U.S. Cl. ................. 219/121.72; 219/121.84
[58] Field of Search ............. 219/121.67, 121.72, 219/121.84

[56] References Cited

U.S. PATENT DOCUMENTS

| | | | |
|---|---|---|---|
| 4,945,207 | 7/1990 | Arai | 219/121.84 |
| 5,578,228 | 11/1996 | Beyer et al. | 219/121.72 |
| 5,609,781 | 3/1997 | Kaga et al. | 219/121.84 |

FOREIGN PATENT DOCUMENTS

| | | | |
|---|---|---|---|
| 0503488 | 9/1992 | European Pat. Off. | 219/121.67 |
| A-0 527 229 | 2/1993 | European Pat. Off. | |
| A-0 600 098 | 6/1994 | European Pat. Off. | |
| 4123716 | 1/1993 | Germany | 219/121.72 |
| 4336010 | 4/1994 | Germany | 219/121.67 |
| 48-5096 | 1/1973 | Japan | |
| 1-321086 | 12/1989 | Japan | 219/121.84 |
| 2-30389 | 1/1990 | Japan | 219/121.72 |
| 3-9284 | 1/1991 | Japan | |
| 94/04306 | 3/1994 | WIPO | 219/121.72 |

*Primary Examiner*—Teresa J. Walberg
*Assistant Examiner*—Gregory L. Mills
*Attorney, Agent, or Firm*—Staas & Halsey

[57] ABSTRACT

A laser beam machining method is disclosed which makes it possible to cut a mild steel sheet or the like at a higher speed. A condenser lens (10a) is arranged within a machining head (10). A laser beam (11) is converged by this condenser lens (10a) and irradiated onto a workpiece. The machining head (10) has an assist gas inlet port (10b) formed through one side wall thereof, to which are connected an oxygen gas cylinder (90) and an inactive gas cylinder (91). The gas supplied via the assist gas inlet port (10b) is delivered as a jet toward the workpiece through the nozzle at the tip of the machining head (10). The oxygen gas cylinder (90) and the inactive gas cylinder (91) are provided with respective electromagnetic valves (90a) and (91a) of which the opening and closing can be electrically controlled. To cut the workpiece, a saturated cutting speed of the workpiece is determined in advance by an experiment or the like. When the workpiece is cut at a speed lower than the saturated cutting speed, an oxygen gas is supplied via the assist gas inlet port (10b), while when the same workpiece is cut at a speed higher than the saturated cutting speed, an inactive gas is supplied via the assist gas inlet port (10b).

5 Claims, 4 Drawing Sheets

LASER BEAM METHOD USING AN INACTIVE GAS AS THE ASSIST GAS

BACKGROUND OF THE INVENTION

1. Field of the Invention

This invention relates to a laser beam machining method of cutting a workpiece by means of a laser beam, and more particularly, to a laser beam machining method suited for cutting a mild steel sheet or the like at a high speed.

2. Description of the Related Art

Laser beam machining is a method of vaporizing or melting material of a workpiece by irradiating onto very small portions of the same a high-density-energy laser beam which is obtained by generating an extremely coherent, monochromatic light and then converging the light by a condenser lens. The laser beam is excellent in controllability, which enables the laser beam machining to be employed in cutting complicated shapes, very small articles with high accuracy, and so forth, under the control of a numerical control unit. To carry out such laser beam machining more efficiently, there has been employed a method of using oxygen as an assist gas for accelerating the melting of material of a workpiece. This assist gas helps not only to accelerate the melting of steel of a workpiece by adding heat of oxidation to heat of the laser beam, but also to blow off and remove molten steel from the worked part.

The chemical reaction caused by the assist gas of oxygen is shown in the following thermochemical formulas:

$$Fe+O_2 \rightarrow (\tfrac{1}{2})FeO+38kJ/cm^3 \qquad (1)$$

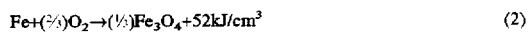

$$Fe+(\tfrac{2}{3})O_2 \rightarrow (\tfrac{1}{3})Fe_3O_4+52kJ/cm^3 \qquad (2)$$

In cutting a mild steel sheet, the use of punching press or plasma rather than a laser beam would enable faster cutting. However, punching press and plasma cutting have the following problems: The former is not suited for cutting very small articles with high accuracy. The latter, which is capable of very high-speed cutting, has an adverse effect on the environment and causes serious wear of various kinds of machine components as well. For this reason, there is a demand for a method of speeding up laser beam cutting, since the laser beam cutting neither has any adverse effects on the environment nor causes serious wear of machine components, and further is excellent in cutting very small articles with high accuracy.

When an attempt is made to speed up laser beam cutting by increasing the laser output power, however, the rate of rise of the cutting speed becomes extremely low after the cutting speed has reached a specific value. The specific value of the cutting speed at which the rate of rise of cutting speed turns very low is called a saturated cutting speed.

FIG. 4 is a diagram showing the relationship between the laser output power and the cutting speed exhibited when oxygen is used as an assist gas. In the illustrated case, a mild steel sheet having a thickness of 1.0 mm is used. As shown in FIG. 4, the cutting speed increases in proportion to the laser output power until the latter reaches a value of 2 kW, but there is hardly any increase in the cutting speed after the laser output power has exceeded 2 kW. The cutting speed of 8 m/min attained when the laser output power is 2 kW is a saturated cutting speed of the present case.

As is understood from the above, it is difficult to gain the cutting speed beyond the saturated cutting speed, even if the laser output power is increased. One possible reason for incapability of increasing the cutting speed is that the rate of removal of molten metal by an assist gas does not keep up with the cutting speed any longer.

If a higher-pressure oxygen gas is supplied as the assist gas to solve the above problem, an excessive oxidation reaction occurs, which increases molten part and hence increases the volume of molten metal to be removed. This prevents the cutting speed from being increased, and what is still worse, causes degraded quality of cut surfaces.

As a result, even a laser beam machine which is capable of emitting a laser beam with a high output power cannot cut at a higher speed than the saturated cutting speed, and instead performs cutting at a lower speed than it can achieve, which prevents the machine from delivering performance to its full capacity.

SUMMARY OF THE INVENTION

The present invention has been made in view of these circumstance, and the object thereof is to provide a laser beam machining method which make it possible to cut a mild steel sheet or the like at a higher speed.

In order to solve the above problems, the present invention provides a laser beam machining method of carrying out cutting by means of a laser beam, comprising the steps of determining a saturated cutting speed by experimental machining, and using an oxygen gas as an assist gas when a cutting speed is below the saturated cutting speed, and using a high-pressure inactive gas or a mixture of the inactive gas and the oxygen gas when the cutting speed is above the saturated cutting speed.

First, the saturated cutting speed of a workpiece to be cut is determined by experimental machining. Then, in actually cutting the workpiece, melting of material thereof is accelerated by supply of oxygen to obtain a cutting speed proportional to the laser output power when the cutting speed is below the saturated cutting speed. When the cutting speed is above the saturated cutting speed, an inactive gas is used to blow off the molten metal at a high rate of removal, to thereby increase the cutting speed.

Further, since the inactive gas is used, machining can be carried out by laser energy alone, which prevents degradation of cut surfaces.

DETAILED DESCRIPTION OF THE PREFERRED EMBODIMENTS

Now, the invention will be described below with reference to drawings showing an embodiment thereof.

Figure 1:
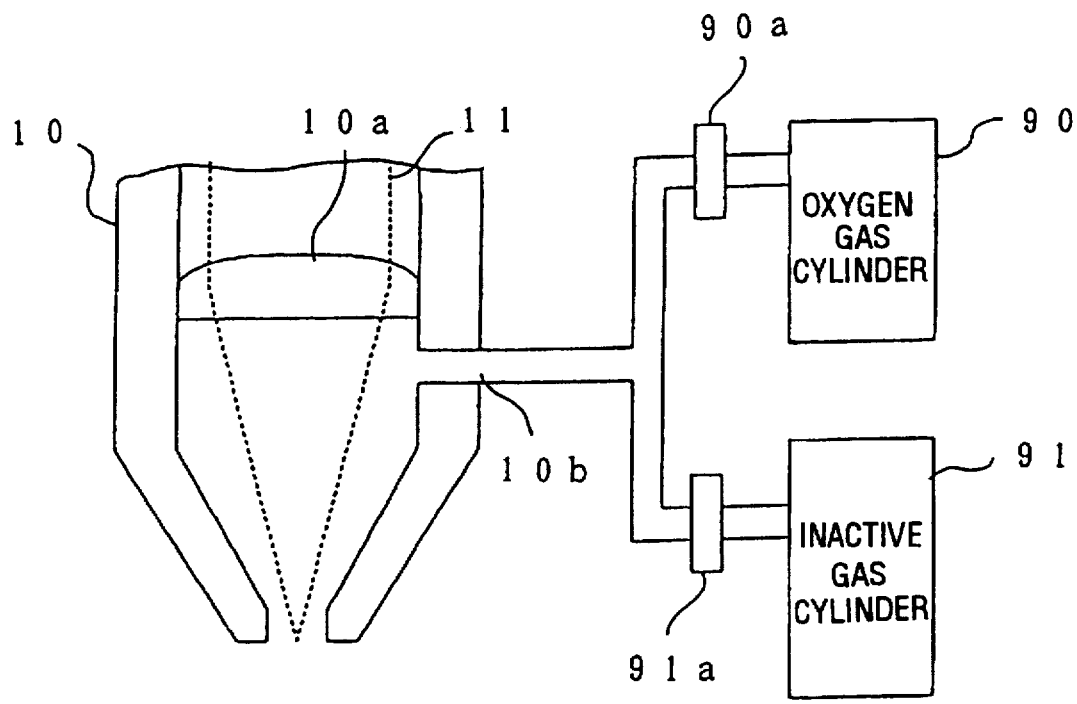
FIG. 1 is a diagram showing an outline of construction of a machining head for use in a laser machining method according to the invention.

Referring first to FIG. 1, there is schematically shown the construction of a machining head used in carrying out a laser beam machining method of the present invention. The machining head 10 has a condenser lens 10a arranged therein. A laser beam 11 is converged by this condenser lens 10a and irradiated onto a workpiece.

The machining head 10 has an assist gas inlet port 10b formed through one side wall thereof, to which are connected an oxygen gas cylinder 90 and an inactive gas cylinder 91. The gas supplied via the assist gas inlet port 10b is delivered as a jet toward the workpiece through the nozzle at the tip of the machining head 10. The oxygen gas cylinder 90 and the inactive gas cylinder 91 are provided with respective electromagnetic valves 90a and 91a of which the opening and closing can be electrically controlled.

To cut a workpiece by the use of a laser beam machine having such a machining head 10, a saturated cutting speed of the workpiece is determined in advance by an experiment or the like. When the workpiece is cut at a speed lower than the saturated cutting speed, an oxygen gas is supplied via the assist gas inlet port 10b, while when the same workpiece is cut at a speed higher than the saturated cutting speed, an inactive gas is supplied via the assist gas inlet port 10b.

The assist gas to be supplied when the cutting speed is above the saturated cutting speed is not necessarily restricted to an inactive gas, but a mixture of an inactive gas and the oxygen gas may be used as well. As the inactive gas, there may be used a nitrogen gas, an argon gas, or the like.

By employing this method, melting of material of the workpiece can be accelerated by the oxygen gas when the cutting speed is below the saturated cutting speed, and when the cutting speed is above the saturated cutting speed, molten metal is blown off by a jet of the inactive gas or the mixture of the inactive gas and the oxygen gas to attain a high rate of removal of the molten metal, which makes it possible to increase the cutting speed.

Figure 2:
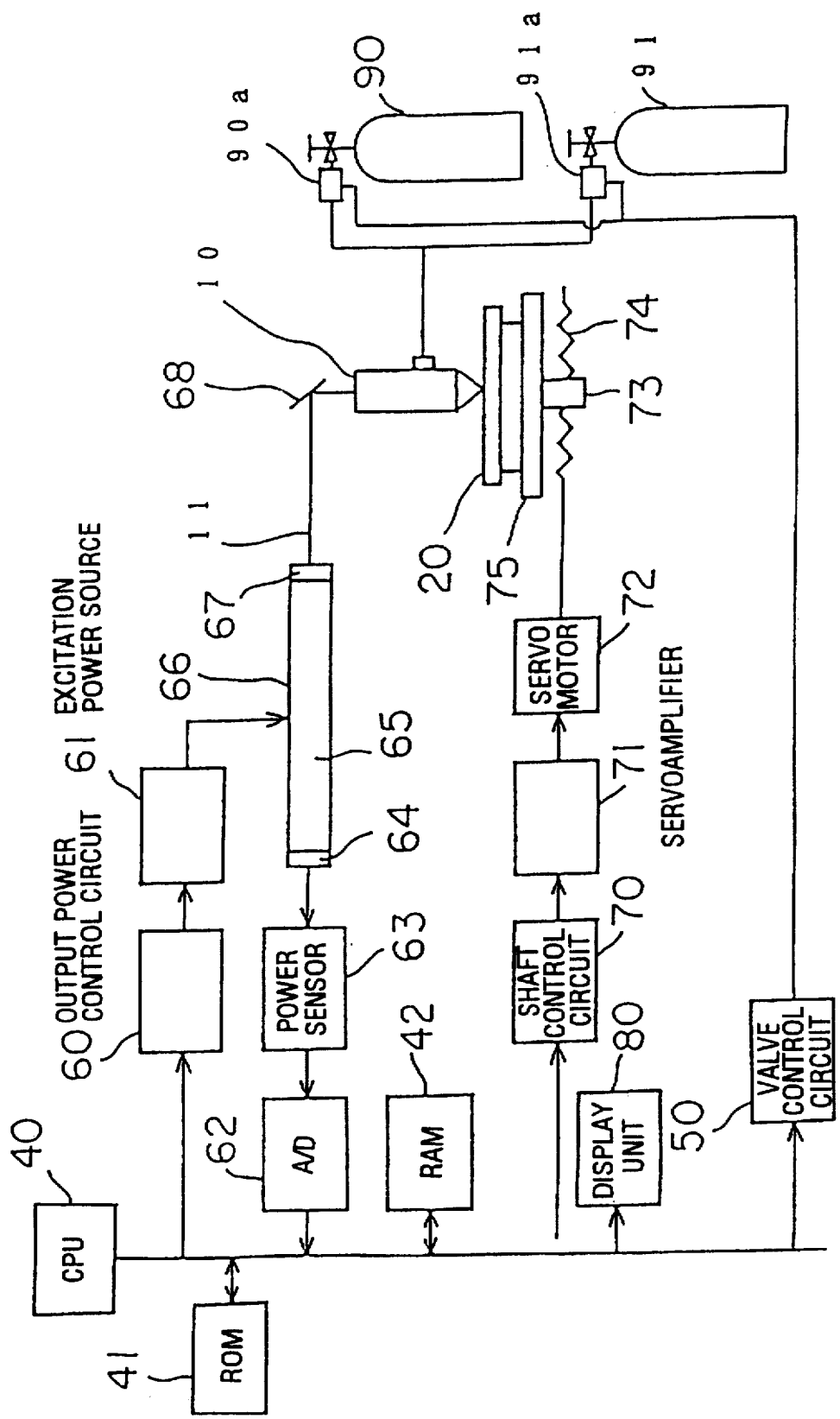
FIG. 2 is a block diagram showing the arrangement of an NC laser beam machine for carrying out the method according to an embodiment of the invention.

FIG. 2 is a block diagram showing the arrangement of an NC laser beam machine for carrying out the laser beam machining method according to the embodiment of the invention. In FIG. 2, a central processing unit (CPU) 40 controls the overall operation of the NC laser beam machine by reading a machining program stored in a random access memory (RAM) 42 according to a control program stored in a read only memory (ROM) 41. An output power control circuit 60 incorporating a digital-to-analog converter converts an output command value received from the central processing unit 40 into a current command value, and then outputs it. An excitation power source 61 rectifies a commercial power supply and then generates high-frequency voltage by switching operation to supply a discharge tube 66 with a high-frequency current commensurate with the current command value.

Inside the discharge tube 66, a laser gas 65 is circulating, and the laser gas 65 is excited by discharge caused by the high-frequency voltage applied by the excitation power source 61. A rear mirror 64 is a mirror made of germanium (Ge) with a reflectance of 99.5%, and an output mirror 67 is a mirror made of zinc-selenium (ZnSe) with a reflectance of 65%. These two mirrors form a Fabry-Perot resonator, which amplifies radiation having a wavelength of 10.6 μm emitted from molecules of the laser gas excited within the discharge tube 66, and delivers part of the amplified radiation through the output mirror 67 to the outside as a laser beam 11.

The output laser beam 11 changes its course at a bending mirror 68, and subsequently it is converged by the condenser lens arranged within the machining head 10 and irradiated onto a workpiece 20, forming a spot having a diameter of less than 0.2 mm thereon.

A shaft control circuit 70 responsive to commands from the CPU 40 controls the rotation of a servomotor 72 via a servoamplifier 71, thereby controlling the motion of a table 75 by way of a ball screw 74 and a nut 73 for control of position of the workpiece 20. Although only a control shaft along the X-axis is shown in FIG. 2, actually, control shafts along the Y-axis and the Z-axis are also provided. A CRT, a liquid crystal display or the like is employed for a display unit 80.

A power sensor 63, which is comprised of a thermoelectric or photoelectric converting element or the like, measures the output power of the laser beam 11 based on a portion of the laser beam partially transmitted through the rear mirror 64. An analog-to-digital converter 62 converts the output from the power sensor 63 to a digital value, which is delivered to the CPU 40.

The machining head 10 is connected to the oxygen gas cylinder 90 and the inactive gas cylinder 91 provided with the electromagnetic valves 90a and 91a, respectively. The electromagnetic valves 90a and 91a are controlled by a valve control circuit 50 which is connected to the CPU 40. The electromagnetic valve 90a is opened to supply the machining head 10 with the oxygen gas when the cutting speed calculated by the CPU 40 is below the saturated cutting speed, and the electromagnetic valve 91a is opened to supply the machining head 10 with the inactive gas when the calculated cutting speed is above the saturated cutting speed.

Figure 3:
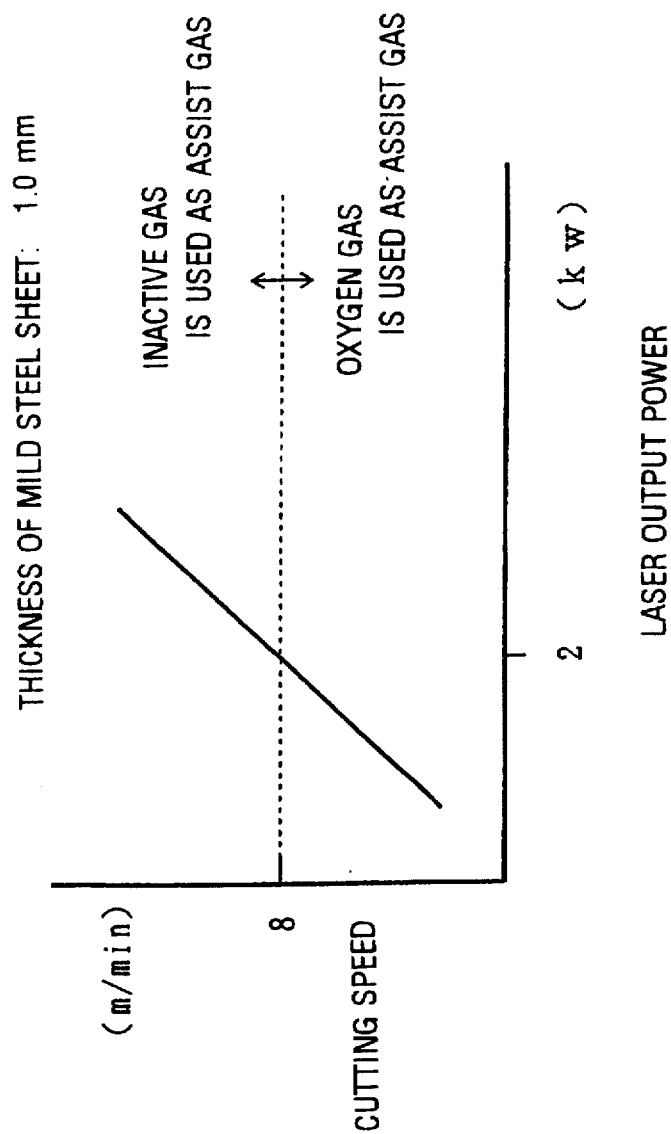
FIG. 3 is a diagram showing the relationship between the laser output power and the cutting speed exhibited when the present invention is applied.
Figure 4:
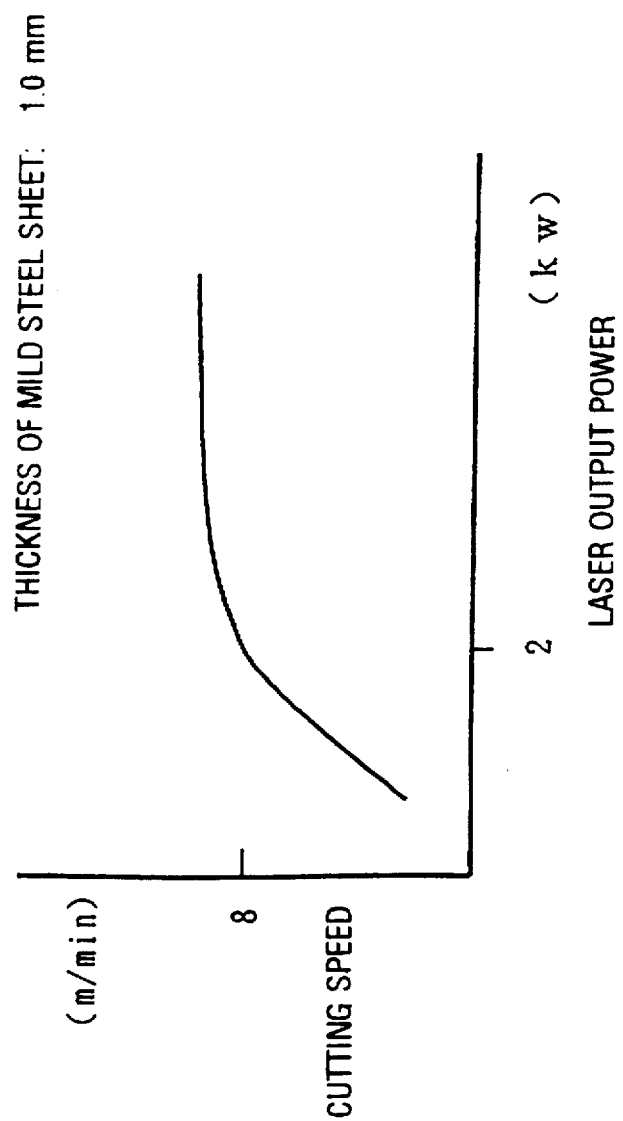
FIG. 4 is a diagram showing the relationship between the laser output power and the cutting speed exhibited when oxygen is used as an assist gas.

FIG. 3 is a diagram showing the relationship between the laser output power and the cutting speed exhibited when the present invention is applied. In the illustrated case, a steel sheet having a thickness of 1.0 mm is used for machining. As shown in FIG. 3, when the cutting speed is below the saturated cutting speed, oxygen is supplied as the assist gas in a conventional manner. Accordingly, the laser output power and oxidation reaction energy are well-balanced within this range of the cutting speed, so that the generation of oxides (FeO, Fe$_3$O$_4$) and the blowing-off of molten metal including the oxides from the workpiece take place efficiently and smoothly. This enables the cutting speed to increase almost in proportion to the laser output power.

On the other hand, when the cutting speed is above the saturated cutting speed, the inactive gas is supplied as the assist gas. This makes it possible to blow off molten metal efficiently to thereby make effective use of the energy of the laser beam irradiated onto the workpiece for cutting. Accordingly, the cutting speed is increased almost in proportion to the laser output power.

As described above, even if the cutting speed is set to a value in excess of the saturated cutting speed, it is possible to increase the cutting speed in proportion to the laser output power, which permits the laser beam machine to deliver performance to its full laser output capacity.

For instance, when the present invention is applied in cutting a 1.0 mm-thick workpiece at a laser output power of 3 kW, a cutting speed of 17 m/min can be attained. For comparison, the cutting speed attainable by punching press is typically 8 m/min, which is the same speed as the saturated cutting speed attainable by the same machine without applying the present invention. When the invention is applied, as mentioned above, it is possible to obtain a cutting speed more than twice as high as the cutting speed attainable by punching press.

Thus, in cutting a workpiece at a higher speed than the saturated cutting speed, an inactive gas or a mixed gas is used as the assist gas, which enables molten metal produced by laser energy to be blown off, achieving a high rate of removal of the molten metal, which makes it possible to increase the cutting speed in proportion to the laser output power. As a result, with a high-output laser beam machine, it is possible to attain a high cutting speed commensurate with the laser output it can attain.

Further, since oxygen is not used to accelerate the melting of metal, formation of a layer of oxide on a cut surface is prevented, which makes it possible to obtain cut surfaces having an excellent quality.

As described heretofore, according to the present invention, oxygen is used as the assist gas when the cutting speed is below a saturated cutting speed, and a high-pressure inactive gas is used as the assist gas when the cutting speed is above the saturated cutting speed, which makes it possible to blow off molten metal at a high rate of removal to thereby increase the cutting speed.

Further, since the inactive gas is used, machining can be performed by laser energy alone, which makes it possible to achieve a high-quality cutting without degrading cut surfaces.

I claim:

1. A laser beam machining method, comprising the steps of:

determining a saturated cutting speed by determining the speed at which laser beam cutting of a work piece no longer increases in speed with increased laser output, when cutting is performed using an oxygen gas as an assist gas;

cutting the work piece below the saturated cutting speed by applying the laser beam to the work piece;

using oxygen as an assist gas when cutting below the saturated cutting speed;

cutting the work piece above the saturated cutting speed by applying the laser beam to the work piece; and using inactive gas as the assist gas when cutting above the saturated cutting speed.

2. A laser beam machining method according to claim 1, wherein a nitrogen gas is used as said inactive gas.

3. A laser beam machining method according to claim 1, wherein an argon gas is used as said inactive gas.

4. A laser beam machining method according to claim 1, wherein a mixture of inactive gas and oxygen is used as the assist gas when cutting above the saturated cutting speed.

5. A laser beam machining method according to claim 1, wherein a higher laser power is used above the saturated cutting speed than is used below the saturated cutting speed.

* * * * *